United States Patent [19]

Arnemann

[11] 3,756,427
[45] Sept. 4, 1973

[54] APPARATUS FOR LOADING SACKS ONTO PALLETS

[76] Inventor: Gerhard Arnemann, Vossbarg 41, Pinneberg, Germany

[22] Filed: Apr. 22, 1971

[21] Appl. No.: 136,382

[30] Foreign Application Priority Data
Apr. 24, 1970 Germany.................. P 20 19 953.5

[52] U.S. Cl................ 214/6 DK, 214/6 P
[51] Int. Cl............................. B65g 57/24
[58] Field of Search................ 214/6 P, 6 DK, 6 H

[56] References Cited
UNITED STATES PATENTS

| | | | |
|---|---|---|---|
| 3,567,046 | 3/1971 | Reist................... | 214/6 DK |
| 3,245,557 | 4/1966 | Maramonte et al.................. | 214/6 P |
| 3,059,787 | 10/1962 | Forsyth.................. | 214/6 P |
| 3,587,876 | 6/1971 | Dahlem.................. | 214/6 P |
| 2,813,638 | 11/1957 | Miller, Jr............. | 214/6 P |
| 3,429,469 | 2/1969 | Peterson................. | 214/6 DK X |
| 3,164,080 | 1/1965 | Miller, Jr............. | 214/6 P X |

FOREIGN PATENTS OR APPLICATIONS
2,005,335 12/1969 France................ 214/6 P

*Primary Examiner*—Robert J. Spar
*Attorney*—Toren & McGeady

[57] ABSTRACT

An apparatus for loading sacks onto pallets, comprising conveyor means, sack positioning and flattening devices, sack transfer devices, a lifting platform for pallets and a packing plate for forming sack layers thereon, transferring the formed sack layers onto a pallet, applying an antiskid agent between the sack layers and shaping the sack layers deposited on a pallet whereby the upper surface of the packing plate is provided with friction reducing and/or bearing area reducing means.

1 Claim, 8 Drawing Figures

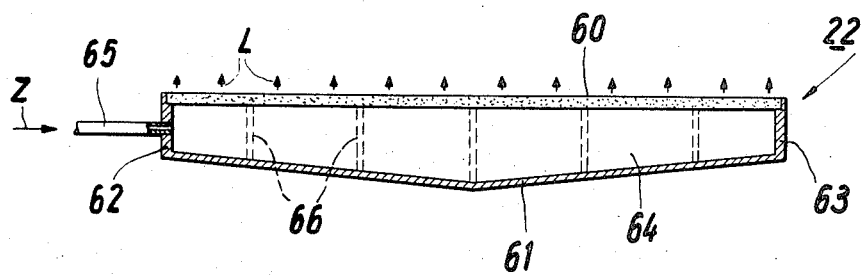
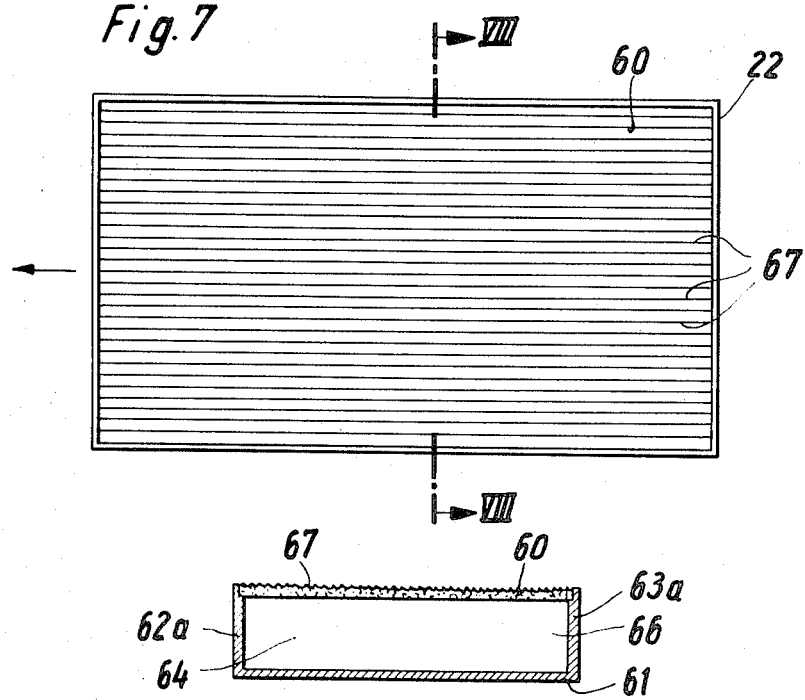

APPARATUS FOR LOADING SACKS ONTO PALLETS

DESCRIPTION OF THE INVENTION

The apparatus disclosed in this application is an improvement over the apparatus disclosed by the same Applicant in his U.S. application Ser. No. 51,975 of July 2, 1970, now U.S. Pat. No. 3,651,962.

There is already known an apparatus for loading sacks onto pallets wherein the sacks are transferred by means of a conveyor belt and a transfer bar movable perpendicularly to the feed direction of the sacks onto a packing plate parallel to the conveyor belt and serving as a transfer means, and then the sacks are transferred from the packing plate onto a pallet which is placed on a platform adapted to be raised or lowered, and the platform for receiving the pallets is lifted upwardly against a movable packing plate after the deposition of a layer of sacks onto the pallet or after the deposition of a layer of sacks onto one layer or several layers of sacks already deposited on the pallet whereby the packing plate is curved outwardly at its lower surface facing the growing stack of sacks such that the thickness of the packing plate increases from its edges towards its center so that the formation of stacks of sacks having an inherent stability and exactly defined outer edges is rendered feasible. In order to still further enhance the stability of the sack stacks for the purpose of rail or vehicle transport, there is furthermore known an apparatus for loading sacks onto pallets in which the packing plate arranged in the form of a receptacle for an antiskid agent to be applied by spraying comprises in its front face several discharge nozzles of a sack layer spraying device connected by a flexible hose means through a feeding device to a reservoir for an antiskid spray liquid arranged at a base frame of the loading apparatus.

It is the object of the present invention to enhance the stability of the stacks of sacks for transportation even if the sacks contain loose or bulk material. It has been shown that in the known apparatus the contents of the sacks may be shifted during the withdrawal of the packing plate from the layer of sacks so that thereby the sacks may be deformed.

The invention accordingly, therefore, proposes an apparatus for loading sacks onto pallets wherein the upper surface of the packing plate which is adapted to receive the various layers of sacks of the double walled packing plate having the form of a receptacle consists of a porous air permeable plastic plate whereby the interior of the receptacle shaped packing plate is connected to a feed conduit for compressed air.

By means of the inventive arrangement of an automatically operating pallet loading apparatus having a packing plate above the upper bearing surface for the various layers of sacks of which is provided an air cushion, it is possible to unite sacks containing bulk material into stacks having an inherent stability by themselves no matter of what material the sacks are made. By providing an air cushion above the packing plate the frictional resistance between sacks and packing plate is considerably reduced when withdrawing the packing plate from the sacks so that shifting of the sack contents will be avoided. Likewise the sack material cannot stick to the packing plate. By using a porous air permeable plastic plate there will be generated above the plate an air cushion which is evenly distributed over the whole plate surface. By providing the surface of the plastic plate with corrugations extending parallel to the withdrawal direction of the packing plate the bearing area of the sacks on the packing plate is still further reduced.

The foregoing and other objects and the advantages of the present invention will appear from the following detailed description of a preferred illustrative embodiment thereof, taken in connection with the accompanying drawings in which:

FIG. 6 is an elevational cross-sectional view of the packing plate having a porous air permeable upper bearing plate for receiving the layers of sacks;

FIG. 7 is a top view of the packing plate and showing the corrugations extending parallel to the withdrawal direction of the packing plate; and FIG. 8 is a vertical cross-sectional view in the direction of the line VIII—VIII of FIG. 7.

Figure 1:
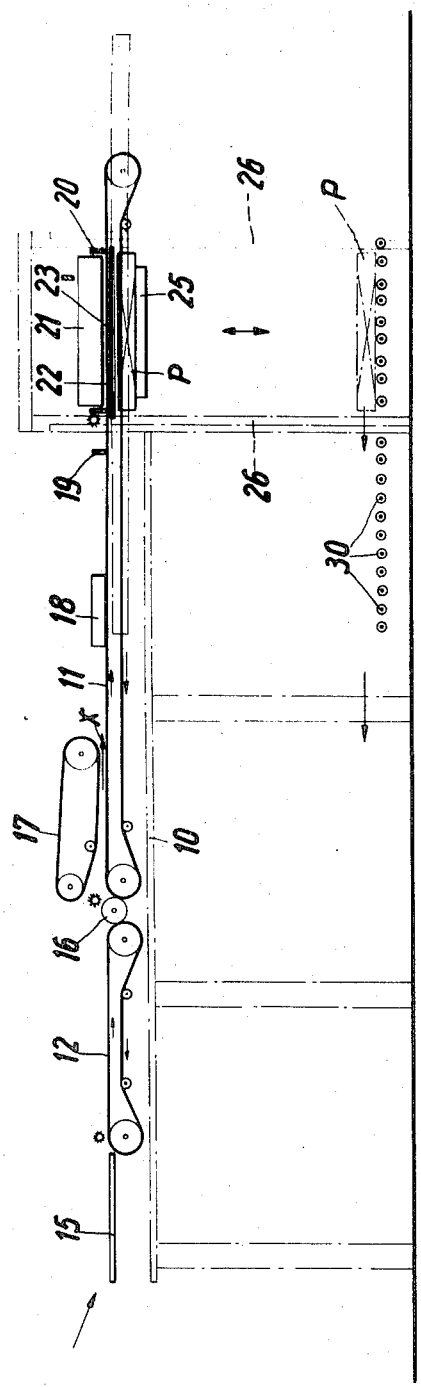
FIG. 1 is a schematical lateral elevational view of an automatic apparatus for loading sacks onto pallets.
Figure 2:
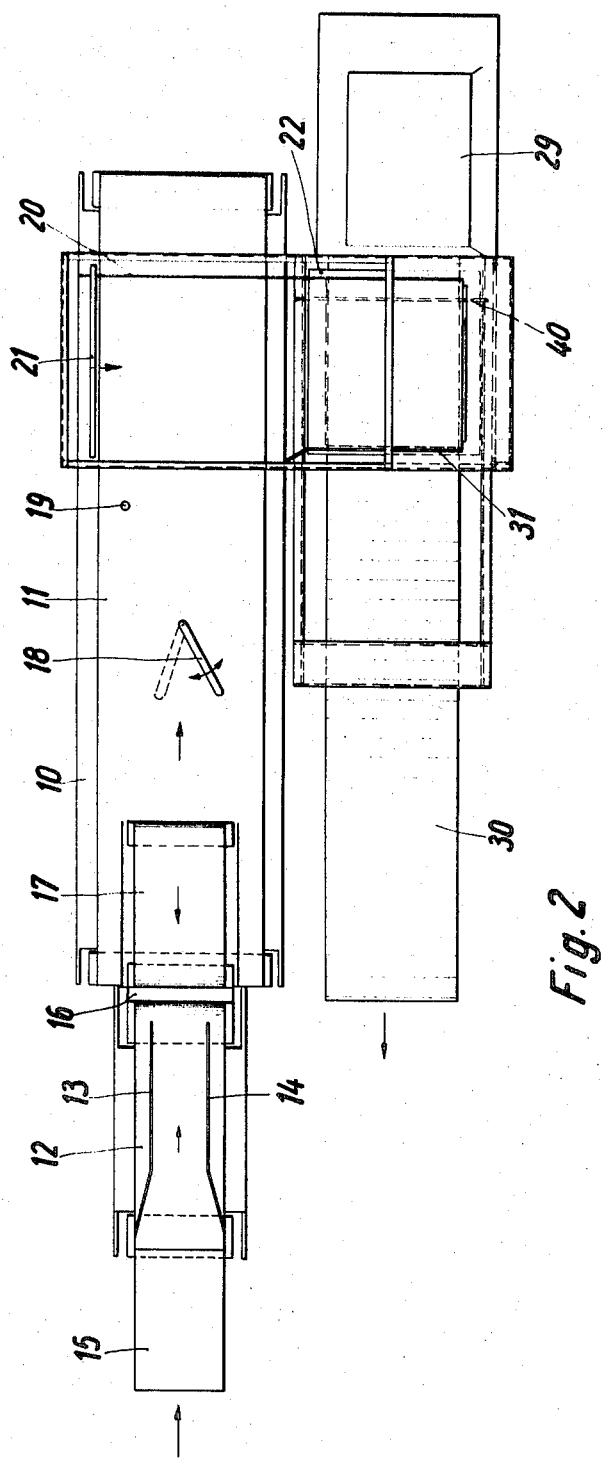
FIG. 2 is a top plan view of the apparatus of FIG. 1.

Referring to FIGS. 1 and 2, the apparatus for loading sacks onto pallets comprises a base frame 10 on which is arranged a continuous conveyor belt 11 and another conveyor belt 12 in advance of the conveyor 11. Mutually spaced guide ledges 13 and 14 are arranged above the conveyor belt 12 and the ends of the ledges facing the feed side are flaring or bent outwardly. The spacing of the two guide ledges is somewhat wider than the width of a sack. This spacing is, however, adjustable (by means not shown). The sacks are aligned by means of the conveyor belt 11 and the guide ledges 13, 14.

A vibrating table 15 is provided on the upstream side of the aligning conveyor belt 12 and serves to uniformly distribute the contents within the sacks. A device for flattening the sacks is arranged at the feed end and spaced above the conveyor belt 11, this device comprising a continuous conveyor belt 17 the direction of rotation of which is such that sacks between the two conveyor belts are moved in the direction of the arrow x. By means of a feed roller 16 which is controlled by an electronic control the sacks are then fed to the conveyor belt 11 which transports the sacks into a region from which the sacks are transferred onto the pallets. In this manner a sack transfer onto other conveyor belts or roller tracks is avoided so that the sacks having a flattened horizontal surface are conveyed in a continuous plane. By means of a plate shaped rotatable guide 18 and a positioning pin 19 above the conveyor belt 11 the sacks are rotated into the required position for forming a stack bindung. The sacks then enter a space bordered by a rear stop bar 20 which extends parallel to the axis of the return roller of the conveyor belt 11. In this space the sacks are made available for transfer onto the pallets.

Figure 4:
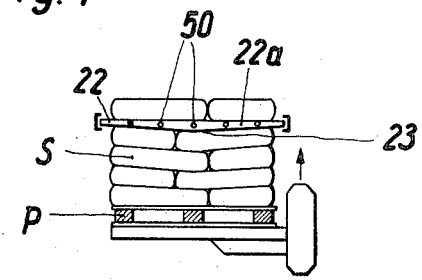
FIG. 4 shows a lateral view of the packing plate with the discharge nozzles for the antiskid agent arranged in the front face of the packing plate.

A transfer bar 21 is provided parallel to the direction of movement of the conveyor belt 11 and serves to transfer a layer of sacks onto a packing plate 22 which is disposed in the same plane as the conveyor belt 11 and above the pallet P. The size of the packing plate 22 approximately corresponds to the loading zone of the pallet. Preferably the packing plate 22 has a small thickness and is movable parallel to the direction of movement of the conveyor belt 11. The lower surface of the packing plate 22 is curved outwardly so that the thickness of the packing plate increases from its edges towards its center. This curved surface is indicated by the reference numeral 23 (FIG. 4). The lower surface of the packing plate 22 preferably has the form of a saddle roof (FIG. 4), however any other type of curvature such as a pyramidal curvature may be provided.

Figure 3:
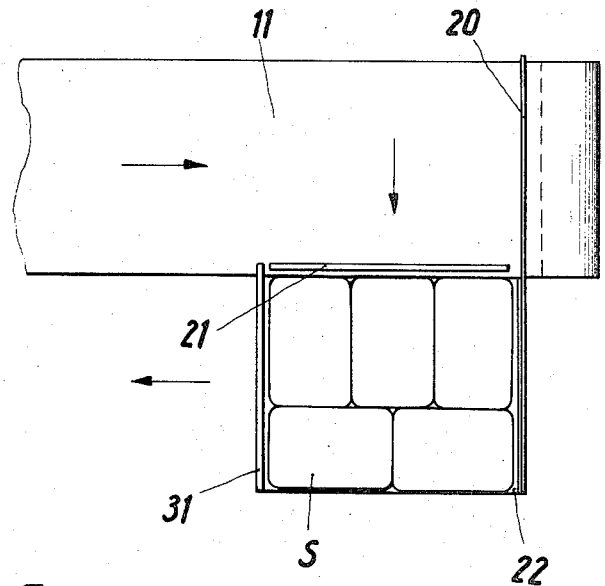
FIG. 3 is a fragmentary view of the conveyor belt, after the transfer of a layer of sacks onto the packing plate.

The unloaded pallet P is guided on a platform 25 which may be raised or lowered and is guided for these movements in lateral guides 26 on the base frame 10. The whole arrangement is such that through the withdrawal of the packing plate 22 below the layer of sacks S (FIG. 3) the sacks will be transferred onto the pallet P without the sacks undergoing any substantial deformation. After loading, the lifting platform 25 together with the pallet P is lowered by a distance corresponding to the height of one layer of sacks such clearing the space for the next following layer of sacks and allowing to return the packing plate 22 into its loading position. For obtaining a tighter stacking, every layer of sacks on the pallet P is again lifted upwardly by an upward movement of the pallet P with the layers of sacks already deposited thereon, until the surface of the uppermost layer of sacks engages the lower surface of the packing plate 22 which has been returned into its loading position, and in this manner the sack surfaces are urged against this lower packing plate surface until the packing plate 22 is again withdrawn.

The fully loaded pallet is then pushed by an empty pallet taken from a stack of pallets 29 arranged by the side of the lifting platform 25 (FIG. 2) onto a roller track 30 from which the pallets are removed for further handling and transportation. After the removal of the loaded pallet the following, i.e. the next empty pallet is moved by means of the lifting platform 25 into the upper loading position. In the meantime another packing layer has been prepared which may now immediately be transferred from the packing plate 22 onto the empty pallet.

Figure 5:
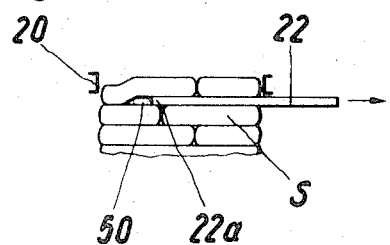
FIG. 5 shows a lateral elevational view of several layers of sacks during the withdrawal of the packing plate and the spraying operation.

For applying a spray liquid of a conventional antiskid agent such as an adhesive, the packing plate 22 is provided at its front face 22a which is opposite to the withdrawal direction of the packing plate with several discharge nozzles 50 of a sack layer spraying device (FIG. 5). These discharge nozzles 50 may be connected by hoses (not shown in the drawings) to a reservoir (not shown) for the antiskid agent spray liquid through a feed device such as a pump of the positive displacement type (not shown). The reservoir for the spray liquid may be arranged at the base frame 10 of the pallet loading apparatus. In an alternate embodiment, the packing plate 22 may be double walled forming a container or receptacle closed on all sides and adapted to receive the antiskid agent. The discharge nozzles 50 will then be arranged in the front face of the container. In the latter embodiment will also be provided a feeding device for ejecting the antiskid agent. This device may have the form of a small booster pump arranged within the packing plate or the form of a plunger which is kept stationary during the withdrawal of the packing plate 22 or is actuatable in the opposite sense so that the antiskid agent will be forced out of the discharge nozzles 50. The plunger arrangement will be such that antiskid agent will also be discharged in the container holds only a small quantity of spray liquid. For introducing the spray liquid into the packing plate 22, the plate comprises a lateral filling tube or inlet which may be closed.

The packing plate 22 is coupled to control members (not shown) adapted to actuate the spraying device during the withdrawal of the packing plate and to interrupt the operation of the spraying device upon termination of the withdrawal movement of the packing plate. The control may be effected by means of limit switches or the like or by means of mechanical devices such as control rods or the like (not shown). Therefore the movements of the packing plate 22 are coupled to the spraying device so that the latter will only be operated during withdrawal of the packing plate 22.

In the embodiment shown in FIG. 6 the packing plate 22 is double walled and has the configuration of a container or receptacle which is closed on all sides and is defined by the walls 60, 61, 62, 63, 62a, 63a. The interior of the packing plate has been indicated by the reference numeral 64. The upper bearing plate 60 of the packing plate 22 consists of a porous air permeable plastic plate which extends preferably over the whole upper surface of the packing plate 22. This plastic plate 60 is arranged in such a manner that compressed air introduced into the interior 64 of the packing plate through a feed inlet indicated at 65 may penetrate through the plastic plate 60 so that there will be generated above the plastic plate an air cushion schematically indicated by the arrows L. Appropriate means (not shown) within the knowledge of those skilled in the art, are provided for maintaining an appropriate air supply to the feed inlet 65. The compressed air emerges from all parts of the plastic plate at the same rate and under the same pressure so that there will be generated an even air cushion layer above the packing plate 22. Reinforcing webs 66 extending from the lower inner wall surface of the packing plate 22 towards the inner wall surface of the plastic plate 60 serve to increase the rigidity of the packing plate 22.

Air is introduced in the feed inlet 65 from an air compressor 100 through a control device 101, which effects control of the compressed air supply to the packing plate as a function of the respective positions of the packing plate. A drive means 102 for actuating movement of the packing plate 22 is operatively connected to the control device 101 so that both the movement of the packing and the supply of compressed air thereto may be cooperatively controlled during a corresponding working cycle.

For reducing the bearing area of the sacks on the bearing plate 60 the packing plate 22 may be additionally provided at its plate 60 with corrugations 67 extending parallel to the withdrawal direction of the plate 22 (FIGS. 7 and 8). These corrugations 67 are arranged in such a manner that they neither interfere with the air cushion formed above the packing plate 22 nor damage the sacks.

What is claimed is:

1. In an apparatus for loading onto pallets sacks having a deformable configuration resulting from the nature of materials contained within said sacks, the combination comprising:

a conveyor belt for conveying in a first direction sacks located thereupon;

a transfer bar movable in a direction perpendicular to said first direction for transferring said sacks off said conveyor belt;

a packing plate formed as an enclosed receptacle having a hollow interior and movable between a first and a second position;

a pallet located relative to said packing plate for receiving said sacks thereupon when said packing plate is moved from said second to said first position;

a vertically movable platform operable to raise and lower said pallet;

said transfer bar operating to move said sacks from upon said conveyor belt onto said packing plate when said plate is in said second position, with withdrawal of said packing plate to said first position operating to deposit said sacks upon said pallet;

nozzle means located on one side of said packing plate for dispensing therefrom an anti-skid spray agent;

a porous air permeable plastic plate formed as the upper element of said packing plate enclosed receptacle and adapted to have air fed therethrough from said packing plate hollow interior thereby to form an evenly distributed, generally uniform air cushion for sacks deposited on said packing plate; and corrugations formed on said porous air permeable plastic plate along the surface thereof which is placed in engagement with said sacks, said corrugations extending parallel to the direction of withdrawal of said packing plate to said second position.

* * * * *